Figure 1:
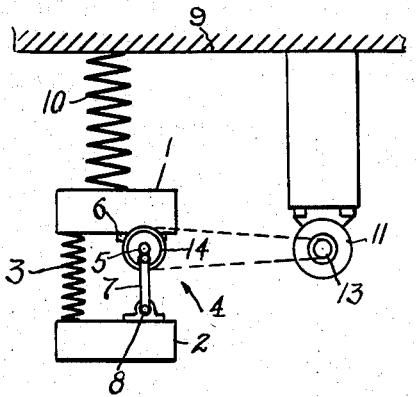

Aug. 2, 1960     R. M. CARRIER, JR., ET AL     2,947,181

RESONANT VIBRATION EXCITER

Filed Jan. 16, 1953

INVENTORS
ROBERT M. CARRIER JR. and
BY JOHN M. MORRIS

Oberlin & Limbach
ATTORNEYS.

United States Patent Office 2,947,181
Patented Aug. 2, 1960

2,947,181

RESONANT VIBRATION EXCITER

Robert M. Carrier, Jr., and John M. Morris, Louisville, Ky., assignors, by mesne assignments, to Chain Belt Company, Milwaukee, Wis., a corporation of Wisconsin Filed Jan. 16, 1953, Ser. No. 331,714

3 Claims. (Cl. 74—26)

The present invention relates generally as indicated to a resonant vibration exciter and more particularly to an exciter wherein a vibrated member is arranged to perform useful work such as conveying, screening, mixing, compacting, blending, drilling, crushing, de-watering, car unloading, and other processing or mechanical applications.

Machines utilizing mechanically, pneumatically, or electromagnetically created vibrations have a number of varied uses as above indicated, but heretofore these machines have, for the most part, been unable to employ natural frequency vibrations to advantage because of failure either to provide for positive control of the amplitude of vibration or to provide elastic means for limiting the magnitude of the vibrational forces imposed on the exciting means during the starting and stopping periods. Both of the foregoing conditions must be satisfied if the full benefit of resonant vibration is to be utilized.

In the case of machines having electromagnetically or pneumatically created vibrations, the vibratory impulse is transmitted across an air gap whereby the amplitude of vibration of the work-producing member is determined by its inertia or weight and by the magnitude of the impulse; and, therefore, if this type of machine is operated at the natural frequency of its resilient supporting means and is so powered that the amplitude of vibration is within structurally safe limits, the imposing of external work load thereon causes appreciable dampening of the amplitude of vibration and thus inability to perform any substantial amount of useful work.

Furthermore, if, during the above-mentioned dampened condition of the machine, the magnitude of the electromagnetic or pneumatic impulse is increased so as to maintain desired amplitude of vibration under external work load, the removal of such load causes multiplication of the amplitude of vibration and consequent imposition of self-destructive internal stresses in the members constituting the vibrating system. For the foregoing reasons, machines having electromagnetically or pneumatically created vibrations usually are designed for operation at frequencies considerably removed from resonant frequency. In other words, when such machines are operated at non-resonant frequency, dampening is not so critical, and a reasonable change in work load does not cause a wide variation in amplitude of vibration.

In mechanically excited machines which employ, for example, rapidly rotating eccentric weights either singly or in oppositely turning pairs, the centrifugal forces created by the rotating eccentric weights produce vibratory impulses. When said eccentric weights are attached directly to a resiliently supported work-producing member or to an intermediate base member located between the work-producing member and the earth or other fixed support, and elastically connected to said work-producing member, useful vibratory motion of said work-producing member is produced. However, because the centrifugal forces of the rotating eccentric weights act only on one member of the vibratory system, the amplitude of vibration is not positively controlled and is determined solely by the inertia or weight of the vibrating masses and the magnitude of the centrifugal forces. When the eccentric weights are fixedly attached to and vibrate with the work-producing member, the vibration of the rotating shaft in combination with the relatively large magnitude of the centrifugal forces causes the shaft bearings to "peen" rapidly.

On the other hand, when the eccentric weights are attached to an intermediate base member as aforesaid, the shaft bearings, while remaining comparatively stationary, are subject to centrifugal forces of even greater magnitude. Another serious disadvantage of the machines which are mechanically excited by eccentric weights, is that the weight of the rotating eccentric masses must be relatively great, for example, approximately one-third of the total weight of the intermediate base member whereby such a relationship of masses is mechanically awkward to reduce to practice.

Furthermore, as in the case of electromagnetically or pneumatically created vibrations, the rotating mass created vibrations do not provide a positive control of the amplitude of vibration; and, therefore, if the machines are operated at resonance, the work-producing member will be subject to critical dampening under the influence of external work load or else the machines will be subjected to self-destructive internal stresses if the external restraint of the work load is removed.

Certain other types of vibration-producing devices employ an eccentric shaft connected by a crank arm to one or more of the vibrating members to maintain positive control of the amplitude of vibration whereby, when these devices are operated at resonance, dampening will not occur regardless of the magnitude of the external work load; nor will the amplitude of vibration exceed structurally safe limits when the work load is removed.

However, hitherto, certain of these vibration-producing devices have lacked a suitably designed elastic connecting means between the eccentric shaft and the work-producing member; and, therefore, these devices have not been able to successfully operate at resonance because of the self-destructive magnitude of the internal stresses during the stopping period. In other words, when the weight of the vibrating mass, that is, the work producing member, is relatively large, the energy stored in the vibrating system at resonance will be extremely high; and when the power is withdrawn from the eccentric shaft, two diametrically opposite actions tend to take place, viz.

(1) The vibrating mass tends to come to rest with gradually decreasing amplitude and constant frequency, and (2) The rotating eccentric shaft tends to come to rest with gradually decreasing frequency and constant amplitude.

Under these conditions, the inertia forces from the vibrating mass is directly impressed on the eccentric shaft and its bearings to the extent that long operating life cannot be expected; and, for this reason, prior art machines employing rotating eccentric cranks with crank arms connected to the work-producing members to create positively controlled amplitudes of vibration usually operate on very weak supporting and connecting springs.

Before proceeding with the objects of the present invention, it is to be understood that for the purposes of the ensuing discussion, a "resonant" machine is one which operates at a frequency substantially equal to the natural frequency of the vibratory members and their connecting springs. In a vibrating system having two degrees of freedom, there are two natural frequencies; and, therefore, the operation of such system at a frequency intermediate the two natural nodes is not resonant operation and, therefore, "wide resonant range" as often used in connection with systems having two degrees of freedom, is a misleading phrase.

In view of the foregoing and other deficiencies in known types of vibrating machines, it is one primary object of this invention to provide a machine wherein the vibrations are of relatively large magnitude and are positively controlled.

It is another object of this invention to provide a machine for vibratory treatment of materials and other useful work while, at the same time, substantially preventing the transmission of vibrations to the supporting structure for the machine or to the earth.

Another object of this invention is to provide a resonant vibration exciter in which substantially the entire input energy is utlized for the production of useful work without substantial dissipation internally or to the supporting structure or earth.

Another object of this invention is to provide a resonant vibration exciter for producing vibrations in such a way that the impressed cyclical forces, as compared with the forces in non-resonant machines, are relatively small with the result that the loads on and the consequent wear of the eccentric bearings and eccentric shaft or equivalent drive means are relatively small.

Another object of this invention is to provide a vibration-producing mechanism of extremely simple design which has but a few moving parts.

Another object of this invention is to provide a resonant vibration exciter which produces vibration of substantially uniform amplitude regardless of the magnitude of the external restraint imposed by the work load.

Another object of this invention is to provide a resonant vibration exciter which produces vibration of substantially uniform amplitude so that the deflections of the moving parts are maintained within safe limits regardless of the external work load or the frequency of the impressed cyclical forces.

Another object of this invention is to provide a resonant vibration-producing mechanism having elastic connecting means for reducing the starting or non-resonant power to a minimum and for yielding during the stopping period when the internal forces are extremely high as previously indicated.

Another object of this invention is to provide a resonant vibration exciter having a positively controlled amplitude of vibration throughout the normal operating range of frequency together with an elastic connecting means which yields under the effect of large non-resonant forces during the starting and stopping periods thereby reducing the starting power to a minimum and limiting the forces impressed on the eccentric shaft and the eccentric shaft bearings during the stopping period.

Other objects and advantages of the present invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
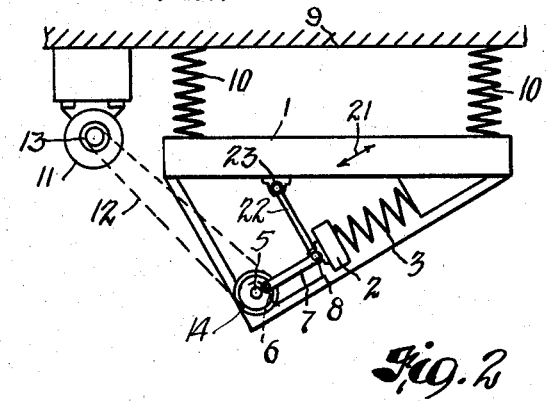
Figure 3:
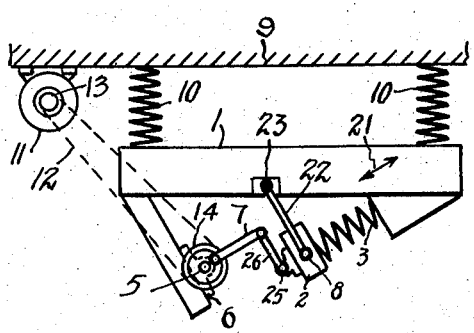
Figure 4:
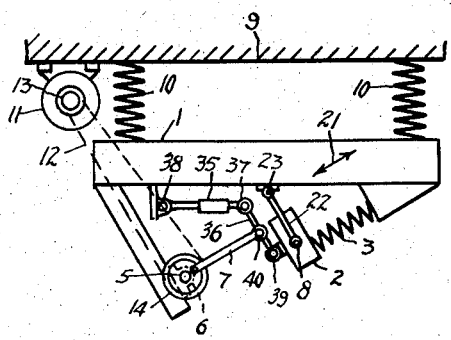

In said annexed drawings:

Fig. 1 is a schematic diagram of one form of the present resonant vibration exciter; and Figs. 2 to 4 are side elevation views, somewhat diagrammatic in character, of vibrating feeders, conveyors, screens, or like material handling apparatuses which embody the present invention.

Referring now in detail to the drawings and first to Fig. 1, the resonant vibration exciter is shown as comprising a work-producing mass 1, an exciting mass 2, a spring 3 interconnecting said masses, a cyclical exciting force producing means 4 including an eccentric or crank shaft 5 rotatably supported in bearings 6 carried by said work-producing mass 1 and a crank arm 7 journalled on the crank pin of said shaft 5 and pivotally connected to said exciting mass 2 through the intermediary of an elastic bushing 8. The entire vibrating system is suspended from the earth or other fixed supporting structure 9 as by means of a relatively weak cushioning spring 10 which supports the vibrating system in space and prevents the transmission of large dynamic forces to the earth or to the supporting structure 9. The power supply for the exciter is herein shown as comprising an electric drive motor 11 also mounted on the earth or supporting structure 9 and operatively connected by belts 12 to said eccentric shaft 5 to cause rotation of the latter. Where belts 12 or equivalent means such as chains are employed, the center line between the belt sheaves 13 and 14 (or chain sprocket wheels) should be generally perpendicular to said crank arm 7 so that said work-producing mass 1 may partake of vibration along the desired path.

As evident, the device illustrated in Fig. 1 comprises a simple vibrating system with two degrees of freedom suspended in space by a relatively weak cushioning spring 10. When said eccentric shaft 5 is rotated, a cyclical exciting force of constant amplitude is impressed simultaneously on said work-producing mass 1 and on said exciting mass 2 at a frequency equal to the r.p.m. of said eccentric shaft 5. Said cushioning spring 10 which supports the entire system from said work-producing mass 1 permits vibration of the latter; and, because said cushioning spring 10 is very weak relative to said connecting spring 3, its effect, as later explained, in the calculation of the natural frequency of the system may be, from a practical standpoint, entirely neglected. The system is tuned to resonance by varying the speed of rotation of said eccentric shaft 5 until its r.p.m. coincides with the natural frequency of the vibrating system composed of said work-producing mass 1, said connecting spring 3, and said exciting mass. In practice, this tuning to resonance is accomplished either by varying the speed of the drive motor 11 or by adjusting the pitch of one or the other of said sheaves 13 and 14 until the ampere draw of said drive motor 11 is a minimum. It has been found that without external work load on said work-producing mass 1, the operating ampere draw of said drive motor will be substantially equal to the no-load draw thereof with said belts 12 disconnected.

The elastic connecting bushing 8 partially deflects during the first half cycle at start-up thereby reducing the starting torque to a minimum; and during operation of the vibration exciter, there is a negligible deflection of said elastic bushing 8 because, during resonant operation, the forces which are transmitted through said crank arm 7 and said bushing 8 are approximately one-tenth that of the magnitude of the forces which would otherwise be required if the connecting spring 3 were omitted. When the machine is stopped and the relative motion of the two masses 1 and 2 is opposed to that of the eccentric shaft 5, said elastic bushing 8 again deflects or yields to prevent imposition of excessive internal stresses on the bearings 6. In fact, an elastic bushing 8 alone is adequate for those conditions of operation wherein the internal elasticity available in said bushing is equal to or greater than one-half the total amplitude of vibration of the two masses 1 and 2. However, when the total amplitude of vibration exceeds these limits, supplementary elastic means such as those illustrated and described with reference to Figs. 3 and 4, should be provided in the drive connection.

An outstanding feature of the invention as illustrated in Fig. 1 (and also in the other figures) is that the amplitude of vibration is independent of the relative weights of the work-producing mass 1 and the exciting mass 2 and is further independent of the frequencies of the impressed cyclical force and of the power delivered by the drive motor 11. Another outstanding feature of the present invention, as will be more particularly pointed out in the ensuing description, is that the weight of the exciting mass 2 may be substantially less than the weight of the work-producing mass 1 to provide an extremely simple arrangement in actual machines; and moreover, the natural frequency of the system approaches a function of the weight of the exciting mass 2 and the spring constant of the connecting spring 3 so that the work load on the work-producing mass 1 will have negligible effect on the resonant frequency of the system.

Another feature of the invention as illustrated in Fig. 1 (and in the remaining figures) is that both the impressed cyclical force and the force of the connecting spring 3 act directly on the work-producing mass 1; and, therefore, said forces jointly oppose and do work against the forces of external work load on mass 1.

In Fig. 2, which is somewhat diagrammatic in character and which has the same reference numerals as in Fig. 1 to denote like parts, there is illustrated a feeder, conveyor, screen, or like work-producing mass 1 suspended from a fixed support or from the earth 9 by means of cushioning springs 10, the work-producing mass 1 constituting, for example, a conveyor pan or a screen deck. The bearings 6 for the eccentric shaft 5 may be fixedly mounted on either the work-producing mass 1 or the exciting mass 2 (herein the work-producing mass 1) and the crank arm 7 from said shaft 5 is pivotally connected through elastic bushing 8 to the other mass (herein the exciting mass 2). A connecting spring 3 is fixedly connected at one end to the work-producing mass 1 and at the other end to the exciting mass 2 and the line of action of the impressed cyclical force and the force of said connecting spring 3 is preferably inclined with respect to the horizontal plane of the material supporting surface of said work-producing mass 1, such inclination generally being between 10° and 45° so as to impart an inclined directional throw motion to said work-producing mass 1 as indicated by arrow 21 for the progressive movement or processing of the material carried thereon.

Substantially straight-line motion of said exciting mass 2 is maintained as by means of a connecting link 22 pivotally connected to said work-producing mass 1 through an elastic bushing 23 and to the exciting mass through the elastic bushing 8. In this case, the power supply again is in the form of an electric drive motor 11 which is fixedly attached to a supporting structure or to the earth 9 and is operatively connected to the eccentric shaft 5 as by means of flexible belts 12 and sheaves 13 and 14 on the drive motor shaft and said eccentric shaft. As in Fig. 1, the center line between the drive motor shaft and the eccentric shaft should be approximately perpendicular to the line of action to enable vibration of said work-producing mass 1 in the inclined direction shown by the arrow 21. It is to be noted that in the Fig. 2 construction, settling of the system by variation of external work load on the work-producing mass 1 is in a vertical direction, whereby the direction of vibration is not changed as is the case in some vibrating systems wherein the cushioning springs 10 are in the form of leaf springs perpendicularly to the path of vibration. The principle of operation of the Fig. 2 construction is basically the same as that of the Fig. 1 construction; and, therefore, repetition of the operation is not deemed necessary.

Because the construction illustrated in Fig. 3 is substantially the same as the construction illustrated in Fig. 2, like reference numerals have been used to designate the same or equivalent parts. The principal difference in the Fig. 3 construction is the addition of a pair of elastic torsion bushings 25 pivotally connected through lever 26 between the crank arm 7 and the exciting mass 2, the function of these elastic bushings 25 in leverage being to increase the effectiveness thereof as contrasted to a single bushing which acts in tension-compression only. In other words, the function of these elastic torsion bushings 25 is to allow an independent motion by the crank arm 7 and the exciting mass 2 during the starting and stopping periods; but, at the same time, said bushings 25 have sufficient internal torsional resistance to remain substantially undeflected at operating speeds which are equal to or are nearly equal to resonant frequency. In this form of the invention, the connecting link 22 connects between masses 1 and 2 through elastic bushings 8 and 23.

In Fig. 4 is illustrated still another apparatus which is generally the same as those illustrated in Figs. 2 and 3, said Fig. 4 apparatus distinguishing essentially in the provision of a hydraulic dash pot 35 connecting one end of the lever 36 between the torsion bushing 37 and the bushing 38 which is fixedly attached to the work-producing mass 1. The other end of lever 36 is connected through elastic bushing 39 to the exciting mass 2 and crank arm 7 is connected between the ends of lever 36 through elastic torsion bushing 40. Because of the inherent characteristics of a hydraulic dash pot 35, very slow out-of-phase motion between the crank arm 7 and the exciting mass 2 can and will automatically take place when only small opposing forces are present but on the other hand, the extremely high resistance of the dash pot 35 to rapid movement or reversal of direction eliminates the possibility of out-of-phase motion at the higher operating speeds whether near resonance or not. Any type of coulomb dash pot in which the resistance to motion is proportional to the velocity will satisfactorily answer the requirements of this arrangement. Therefore, a sliding frictional device would theoretically be satisfactory; but, from a practical standpoint, it has been found that an ordinary automotive shock absorber 35 serves to best advantage.

In an actual physical embodiment of the general type of machine illustrated in Figs. 2 to 4, as for example the one shown in Fig. 3, the work-producing mass 1 had a weight of 105 lbs., the exciting mass 2 had a weight of 10 lbs., the eccentricity of the shaft 5 was ½ inch to produce a total vibratory amplitude of 1 inch, and the natural frequency was 1469 c.p.m. The work-producing mass 1 had an absolute amplitude of ⅛ inch with respect to the earth 9, and the exciting mass 2 had an absolute amplitude of ⅞ inch with respect to the earth 9 and these two absolute amplitudes were 180° out-of-phase. At resonance, the ampere draw of the drive motor 11 was less than 1% greater than the no-load draw of the motor with the belts 12 disconnected. By removing the connecting spring 3 and otherwise leaving the machine unchanged, the ampere draw of the drive motor was 150% greater than the no-load ampere draw. When this Fig. 3 machine was operated underneath a bin on which was imposed a four-foot static head of sand, there was no dampening of the relative amplitude of vibration and the absolute amplitude of vibration of the work-producing mass 1 with respect to the earth 9 dampened only very slightly.

While coil springs 3 and 10 are herein employed, it will be apparent that springs 10 in Figs. 2 to 4 may be replaced by rubber bands, longitudinally inflexible cables or the like having their ends secured to support 9 and to mass 1 and being disposed to offer low resistance to vibration of mass 1 and that springs 3 (and guide arms 22) may be replaced as by leaf springs having their ends secured to masses 1 and 8 as at the points 8 and 23.

While several embodiments of the invention have been illustrated and described, it will be apparent to those versed in the art that these various combinations may be recombined as desired and other arrangements worked out which are not specifically illustrated herein.

In all of the resonant vibration exciters herein depicted, the cushioning springs 10 will be relatively weak as compared with the connecting springs 3; and if the former, that is springs 10, are selected so that the natural frequency of the entire vibratory system supported thereby is about one-fifth of or less than one-fifth of the natural frequency of the system comprising the work-producing mass 1, the connecting spring 3, and the exciting mass 2, the entire system for all practical purposes, has but one natural frequency as computable by the formula:

$$Fn = 187.8 \sqrt{\frac{K}{W_1} + \frac{K}{W_2}}$$

wherein $Fn$ is the natural frequency in c.p.m.; $K$ is the connecting spring 3 rate in lbs./in.; $W_1$ is the weight of the work-producing mass 1 in lbs.; and $W_2$ is the weight of the exciting mass 2 in lbs.

By analyzing the foregoing formula, it is apparent that, for most practical applications wherein the exciting mass 2 is small compared to the work-producing mass 1, the effect of the external work load will have only a negligible effect on that natural frequency of the system; and, furthermore, so long as the accelerations of the work-producing mass 1 exceed the acceleration of gravity, there will be a period of time during each cycle in which the reaction of the external work load will be zero, and at this time the system will automatically return to its pre-set resonant period.

Following is an example to show the negligible effect of the work load on the natural frequency of the system. In this example, $W_1$ equals 100 lbs.; $W_2$ equals 10 lbs.; and $K$ equals 1,000 lbs. per inch. Therefore:

$$Fn = 187.8 \sqrt{\frac{1000}{100} + \frac{1000}{10}} = 187.8\sqrt{110} = 1965 \text{ c.p.m.}$$

Now, if the work load effectively doubles the weight $W_1$ of the work-producing mass 1, then:

$$Fn = 187.8 \sqrt{\frac{1000}{200} + \frac{1000}{10}} = 187.8\sqrt{105} = 1940 \text{ c.p.m.}$$

Therefore, the natural frequency changes less than 1.5% although the effective weight $W_1$ of the work-producing mass 1 has been doubled. It is, therefore, apparent that where, for example, a 5% deviation can be tolerated in a natural frequency machine, a considerable change in the effective weight $W_1$ of the work-producing mass 1 may be effected, whereby the machine is operated in resonance regardless of the variation in the external work load.

In conclusion, it is apparent that the present resonant vibration exciters as disclosed herein fulfill the previously recited objects of the invention and have the necessary attributes for desired operation which are lacking in prior art structures. Thus, the present constructions as illustrated in Figs. 1 to 4 have a positive relative amplitude between the work-producing mass 1 and the exciting mass 2, and, in addition, in all of the forms of the invention disclosed herein, there is a resilient suspension between the system and the earth or other supporting structure. Moreover, the present constructions are actually resonant and will not critically dampen under external work load nor will they become self-destructive when the work load is removed after the system has been brought up to the desired amplitude of vibration under the external dampening load. As pointed out in the introductory portion of this disclosure, certain of the prior art structures utilize a constant cyclical force-producing means whereby the amplitude of vibration varies during operation under changing work load, while in the present case the force is variable but the relative amplitude is constant.

Further summarizing the present constructions and comparing the same with prior art, there is here provided an exciting mass 2 which has a relatively small weight compared to the work-producing mass 1 and the exciting force in most instances acts on both the work-producing mass 1 and the exciting mass 2 and is variable in magnitude as required, whereas in certain prior art structures the masses are usually approximately equal to each other and the exciting force acts only on the exciting mass with constant inertia force. Insofar as the load damping force is concerned, in the present case this force acts on the work-producing mass 1 only and is resisted by the exciting force directly, whereas in certain prior art structures, the load dampening force, while acting on the work-producing mass, cannot be resisted by the exciting force directly. Similarly, the amplitude of vibration in the present constructions is controlled at all times, whereas the prior art constructions which employ eccentric weights on one member, do not produce a controlled relative amplitude whereby there is almost complete loss of motion of the other mass under work load.

The development of a natural frequency vibration exciter as herein described is based on an entirely new principle and basically involves two masses—a work-producing mass 1 and an exciting mass 2—suspended in space by very weak cushioning spring 10 or equivalent means, the two masses being connected together by a relatively stiff connecting spring 3 and being acted on simultaneously by an alternating exciting force in such a manner that the maximum relative amplitude of the masses 1 and 2 remains constant. External useful work is done by one mass only—that is, the work-producing mass 1—and the supporting or cushioning spring 10 supports the entire system in space and is so designed as best shown in Figs. 2 to 4 that it has practically zero stiffness in the direction of vibration as denoted by the arrow 21 in said figures.

As discussed in connection with each of the several figures, the work-producing mass 1 becomes the conveyor pan, the screen deck, or may be the impacting mass which acts on the chisel point of a vibrating hammer, the bed of a truck which is to be unloaded by means of directional throw vibration, the body of a railroad car to be unloaded, the support for foundry molds or containers for material compactors, liquid mixers, or any other bodies on which work is to be done by means of harmonic vibrations.

While in the example previously given the ratio between the weights $W_1$ and $W_2$ is 10:1, it is to be understood that the ratio can be less but, of course, the work load on the work producing mass cannot change the effective weight $W_1$ to the same extent as in the example given since, in this case, the natural frequency change becomes greater than desired. However, it has been found that with moderate changes in work load on the work producing mass, the ratio $W_1:W_2$ may be approximately as low as 5:1 and even less in cases where light, fluffy materials are being handled by the work producing mass.

Other modes of applying the principle of the invention may be employed, change being made as regards the details described, provided the features stated in any of the following claims, or the equivalent of such, be employed.

We therefore particularly point out and distinctly claim as our invention:

1. In a machine for doing work by vibration, in combination, an exciter mass, a work performing mass several times greater in magnitude than said exciter mass, spring means connecting said masses and forming with said masses a two mass resonant system having a natural frequency, cushioning means for supporting said masses in space, and constant amplitude cyclical force producing means including a yieldable member connected between said masses and operated at a speed generally equal to said natural frequency.

2. The combination of claim 1 wherein the work producing mass is at least ten times greater than the exciter mass.

3. The combination of claim 1 wherein the natural frequency of said masses on said cushioning means is less than about one fifth of the natural frequency of said resonant system.

References Cited in the file of this patent

UNITED STATES PATENTS

| | | |
|---|---|---|
| 1,757,392 | Schieferstein | May 6, 1930 |
| 1,820,239 | Merz | Aug. 25, 1931 |
| 2,179,442 | Wolz | Nov. 7, 1939 |
| 2,332,600 | Rapp | Oct. 26, 1943 |
| 2,333,435 | Muskat | Nov. 2, 1943 |
| 2,353,492 | O'Connor | July 11, 1944 |
| 2,575,143 | Strain | Nov. 13, 1947 |
| 2,636,719 | O'Connor | Apr. 28, 1953 |

FOREIGN PATENTS

| | | |
|---|---|---|
| 630,002 | Germany | May 18, 1936 |
| 475,638 | Great Britain | Nov. 23, 1937 |
| 828,944 | Germany | Jan. 21, 1952 |
| 1,027,230 | France | May 8, 1953 |